(12) United States Patent
Daum

(10) Patent No.: US 8,010,120 B2
(45) Date of Patent: Aug. 30, 2011

(54) ADAPTIVE SENSITIVITY IN WIRELESS COMMUNICATION

(75) Inventor: Daniel Thomas Daum, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 408 days.

(21) Appl. No.: 11/136,376

(22) Filed: May 25, 2005

(65) Prior Publication Data
US 2005/0277385 A1 Dec. 15, 2005

Related U.S. Application Data

(60) Provisional application No. 60/578,296, filed on Jun. 10, 2004, provisional application No. 60/640,084, filed on Dec. 30, 2004.

(51) Int. Cl.
*H04W 72/00* (2009.01)

(52) U.S. Cl. .... 455/450; 455/62; 455/161.1; 455/67.11; 455/452.2; 455/455

(58) Field of Classification Search ........... 455/450–455
See application file for complete search history.

(56) References Cited

U.S. PATENT DOCUMENTS

| | | | |
|---|---|---|---|
| 5,418,839 A * | 5/1995 | Knuth et al. .............. 455/464 |
| 5,940,747 A * | 8/1999 | Grohgans et al. .......... 455/168.1 |
| 6,707,858 B1 * | 3/2004 | Davie .......................... 375/316 |
| 2002/0136268 A1 * | 9/2002 | Gan et al. ..................... 375/133 |
| 2005/0070294 A1 * | 3/2005 | Lyle et al. .................. 455/452.2 |

* cited by examiner

*Primary Examiner* — Zhiyu Lu

(57) ABSTRACT

A method of accommodating aberrant behavior in wireless devices in a wireless network includes the steps of establishing communication with at least one wireless device, monitoring signals received from the at least one wireless device, determining characteristics of the at least one wireless device based on the monitored signals, comparing the determined characteristics with prescribed characteristics for wireless devices exhibiting aberrant behavior and altering settings to accommodate the at least one wireless device, when the determined characteristics match the prescribed characteristics.

27 Claims, 3 Drawing Sheets

ADAPTIVE SENSITIVITY IN WIRELESS COMMUNICATION

REFERENCE TO RELATED APPLICATIONS

This application claims priority of U.S. Provisional Patent Application Ser. Nos. 60/578,296, filed on Jun. 10, 2004 and 60/640,084, filed on Dec. 30, 2004. The subject matter of these earlier filed applications are hereby incorporated by reference.

BACKGROUND OF THE INVENTION

1. Field of the Invention

The present invention relates to wireless communication between devices. In particular, the present invention is directed to techniques applicable to detect wireless devices that exhibit "aberrant" behavior, with respect to most wireless devices. The techniques disclosed herein allow for proper, standard communications between devices, even when some of those devices are operating outside of certain norms.

2. Description of Related Art

In recent years, there has been rapid growth in mobile computing and other wireless data services, as well as growth in fixed wireless access technologies. These services have the benefit of not requiring wiring between nodes to support the networking and potentially allow for communication where it could be difficult to provide a wired infrastructure. These services can be used to provide high quality telephony, high-speed Internet access, multimedia and other broadband services.

These wireless devices are tied together through their use of common networking infrastructures. Such wireless networking infrastructures include Institute of Electrical and Electronics Engineers (IEEE) standards 802.11, specifying an over-the-air interface between a wireless client and a base station or between two wireless clients. The standards allow for transmission between 1-54 Mbps in 2.4 GHz or 5 GHz bands and allow for use frequency hopping spread spectrum (FHSS), direct sequence spread spectrum (DSSS), or an orthogonal frequency division multiplexing (OFDM) encoding scheme. In order for the wireless devices to properly interact, they must all conform to the same standard, or overlapping standards.

However, even if the wireless devices conform to the established standards, there can be issues that arise. Devices that strictly conform to a standard may operate in a manner that a majority of the other wireless devices do not. One example occurs with IEEE 802.11 channels, where each channel has a known width. "Well behaved" devices, which are the vast majority of the devices operating in the world today, send and receive packets in the center of that channel. Most devices do not watch for packets out at the edges of the channel. This is a basic tradeoff between channel width and general receive sensitivity. This is particularly an issue with direct conversion radios, a popular method for implementing the exchange of data. If the entire width of the channel is monitored, then general sensitivity would be reduced.

When a wireless device sends and receives packets toward the edge of the channel, the packets can be lost if only the center is being monitored and the device may become disassociated from other network elements. While the monitored portions of the channel can be widened, this has deficiencies in that if one of these poorly behaved network devices are not be accessed, there would be a loss in receive sensitivity and some compatibility issues occur, which can be hard to resolve. Such a problem could also be dealt with by increasing a tolerable number of dropped packets, but this would affect decisions wireless devices make during roaming, resulting in decreased reliability.

Thus, there is a need in the prior art to have wireless devices that have an adaptable sensitivity to other wireless devices that operate outside the norms of most of the devices in the wireless network. Such adaptable sensitivity should allow for a wide variety of the devices to communicate without adversely affecting the reliability of communications within the network.

SUMMARY OF THE INVENTION

According to one embodiment, a method of accommodating aberrant behavior in wireless devices in a wireless network is disclosed. The method includes the steps of establishing communication with at least one wireless device, monitoring signals received from the at least one wireless device, determining characteristics of the at least one wireless device based on the monitored signals, comparing the determined characteristics with prescribed characteristics for wireless devices exhibiting aberrant behavior and altering settings to accommodate the at least one wireless device, when the determined characteristics match the prescribed characteristics.

Additionally, the steps of monitoring signals, determining characteristics and comparing the determined characteristics may be repeated a predetermined number of times before altering the settings, where the predetermined number may be three. The step of establishing communication with at least one wireless device may include establishing communication with an access point controlling at least a portion of the wireless network. Also, the steps of monitoring signals, determining characteristics and comparing the determined characteristics may be performed such that they differentiate when the at least one wireless device is no longer in communication.

Also, the step of monitoring signals received from the at least one wireless device may include determining whether beacon signals are continuously being received from the at least one wireless device. Additionally, the step of altering settings may include modifying physical layer settings to increase frequency tracking bandwidth. In addition, the physical layer settings may be reset after a predetermined period of time. The step of establishing communication may include associating with the at least one wireless device according to at least one of Institute of Electrical and Electronics Engineers (IEEE) 802.11 standards. Also, the step of comparing the determined characteristics may include comparing the determined characteristics with characteristics for wireless devices exhibiting aberrant behavior, where that aberrant behavior complies with communications standards for the wireless network.

According to another embodiment, a wireless device in communication in a wireless network is disclosed. The device includes establishing means for establishing communication with at least one wireless device, monitoring means for monitoring signals received from the at least one wireless device, determining means for determining characteristics of the at least one wireless device based on the monitored signals, comparing means for comparing the determined characteristics with prescribed characteristics for wireless devices exhibiting aberrant behavior and altering means for altering settings to accommodate the at least one wireless device, when the determined characteristics match the prescribed characteristics.

According to another embodiment, a wireless device in communication in a wireless network is disclosed. The device includes at least one antenna and at least one processor, for sending, receiving and processing signals received and sent through the at least one antenna. The at least one processor is configured to establish communication with at least one wireless device, monitor signals received from the at least one wireless device, determine characteristics of the at least one wireless device based on the monitored signals, compare the determined characteristics with prescribed characteristics for wireless devices exhibiting aberrant behavior and alter settings to accommodate the at least one wireless device, when the determined characteristics match the prescribed characteristics.

These and other variations of the present invention will be described in or be apparent from the following description of the preferred embodiments.

BRIEF DESCRIPTION OF THE DRAWINGS

For the present invention to be easily understood and readily practiced, the present invention will now be described, for purposes of illustration and not limitation, in conjunction with the following figures.

DETAILED DESCRIPTION OF PREFERRED EMBODIMENTS

Figure 1:
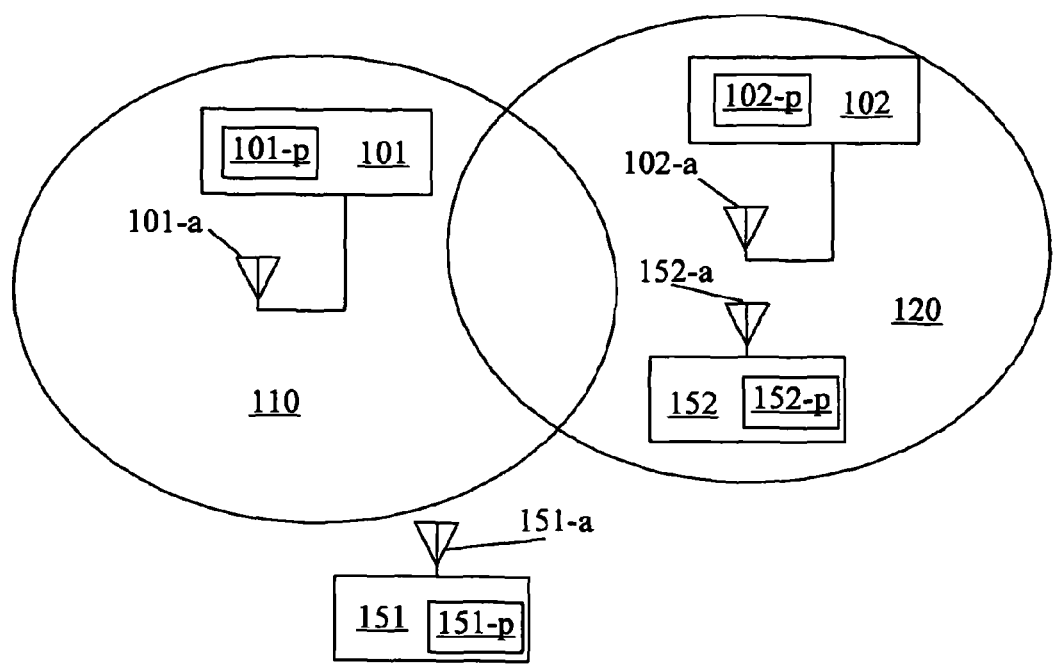
FIG. 1 illustrates a schematic representation of a wireless network with access points and several wireless devices, according to one embodiment of the present invention.

A general wireless network is illustrated in FIG. 1. Two Access Points (APs) 101 and 102 are illustrated, with each AP providing a wireless access area, 110 and 120, respectively. The areas are determined by the power of the APs and geometries of the antennas 101-*a* and 102-*a* of the APs. Wireless devices, 151 and 152, also have antennas, 151-*a* and 152-*a*, and can interact with the APs if the wireless devices are within the wireless access areas. As illustrated in FIG. 1, device 152 would be within the coverage area of AP 102 and wireless device 151 is outside of both areas. All of the wireless devices, 101, 102, 151 and 152, can have processors, 101-*p*, 102-*p*, 151-*p* and 152-*p*, for receiving, sending and evaluating signals on the wireless network. Once a device enters a wireless access area, it seeks to associate itself with the AP and there after send and receive signals to maintain the wireless connection.

Figure 2:
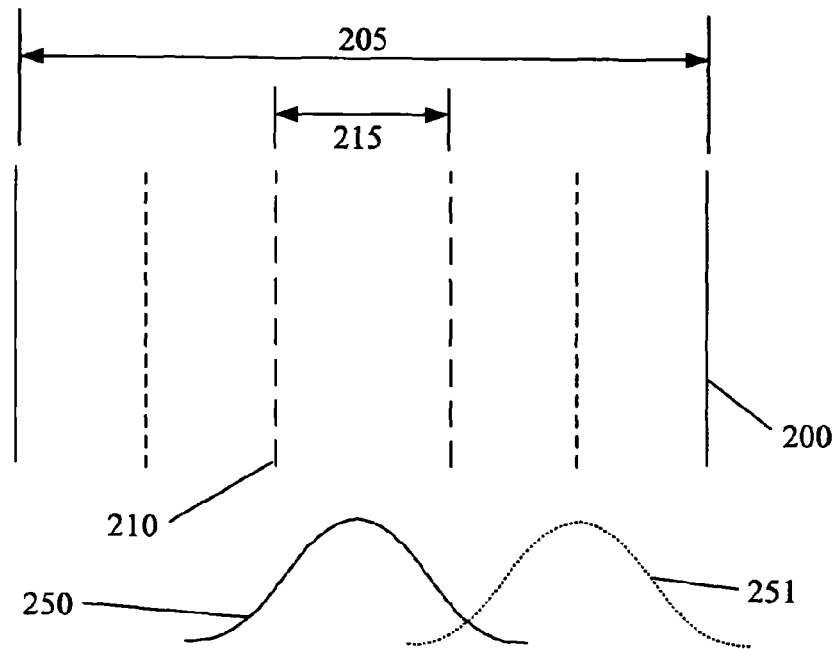
FIG. 2 illustrates a schematic of a channel width of an access channel for an access point of a wireless network, according to one embodiment of the present invention.

As discussed above, IEEE 802.11 channels have known widths. One such channel is illustrated in FIG. 2. The edges of the channel are illustrated by the extreme lines 200, with subchannel areas noted by other lines 210, with the channel width 205 spaced about a center frequency. Well behaved devices send and receive packets, illustrated in FIG. 2 as 250, in the center of that channel 215 and do not watch for packets out at the fringe elements of the channel.

Certain devices can send out signals at frequencies that bounce wildly within the channel space. Such a signal is illustrated in FIG. 2 as 251. When this occurs, the wireless device cannot reliably see the packets being sent. Some devices have an additional difficulty in that they only send certain management frames (beacons) at the 11 Mbit rate, and, as such, the wireless device cannot maintain connectivity with the Access Point (AP).

While the wireless devices have the ability to widen the channel boundaries at which packets are monitored, this has deficiencies in that if it is not one of these poorly behaved Access Points being accessed, receive sensitivity could be lost and some compatibility issues could arise which could be hard to resolve.

There are several obvious solutions to such problems, but those solutions have their own problems. The wireless device could have a "channel wide" mode, as well as going into a mode where a mass amount of dropped beacons is accepted to maintain connectivity. Both of these "solutions" have problems. The first solution has already been discussed, and can result in reduced sensitivity. The second solution has difficulties because it would inflict poor roam decisions for all other access points that the wireless device attempts to work with.

The present invention seeks to "fingerprint" the AP and take certain actions where an AP with known abnormal behavior is identified. In the above-discussed case, once the aberrant AP is detected, the channel evaluation regions could be widened, and subsequently when the wireless device disassociates from the AP, the width of the channel evaluation could return to normal.

Figure 3:
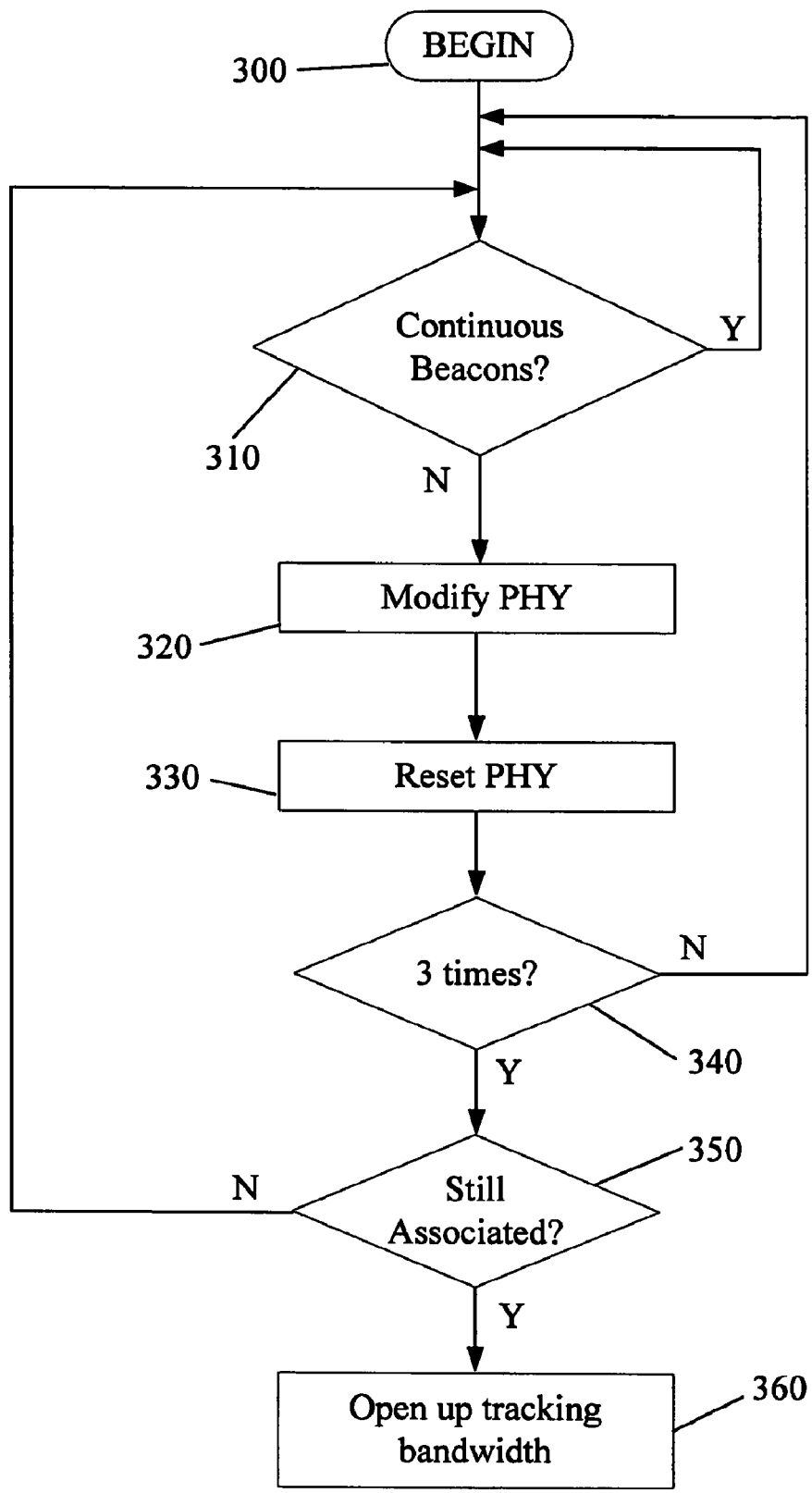
FIG. 3 provides a flowchart of the process identifying and interacting with non-standard wireless devices, according to one embodiment of the present invention.

One embodiment of such a fingerprinting process is illustrated in FIG. 3, with the process beginning at step 300. In one embodiment, the wireless device would determine whether beacons were being received from an AP with which the wireless device is associated, in step 310. If beacons are still being received according to a prescribed interval, no action is taken and the process of monitoring beacon activity continues. If beacons are not continuously being received, the wireless device increases the frequency tracking bandwidth, in step 320. In a particular embodiment, the finding is made only if the wireless device fails to receive beacons continuously for 7 seconds. Other timings can be selected based on particular system requirements.

Thereafter, the wireless devices determine whether it can receive beacons using the expanded bandwidth. If the wireless device receives a beacon with this increased bandwidth, it will restore the bandwidth to the narrow setting, step 330, and check if it can receive packets with the narrower bandwidth (i.e. go back to step 310). If steps 310 through 330 are repeated, for example, three times, step 340, while the wireless device is associated with the AP, step 350, the wireless device will accept the wide frequency tracking bandwidth, in step 360. This ensures that the wide bandwidth will only be selected, if it has been confirmed at least three times, that the wide bandwidth is indeed what is needed to receive beacons and not the wireless device roaming in and out of the service area of the AP.

Figure 4:
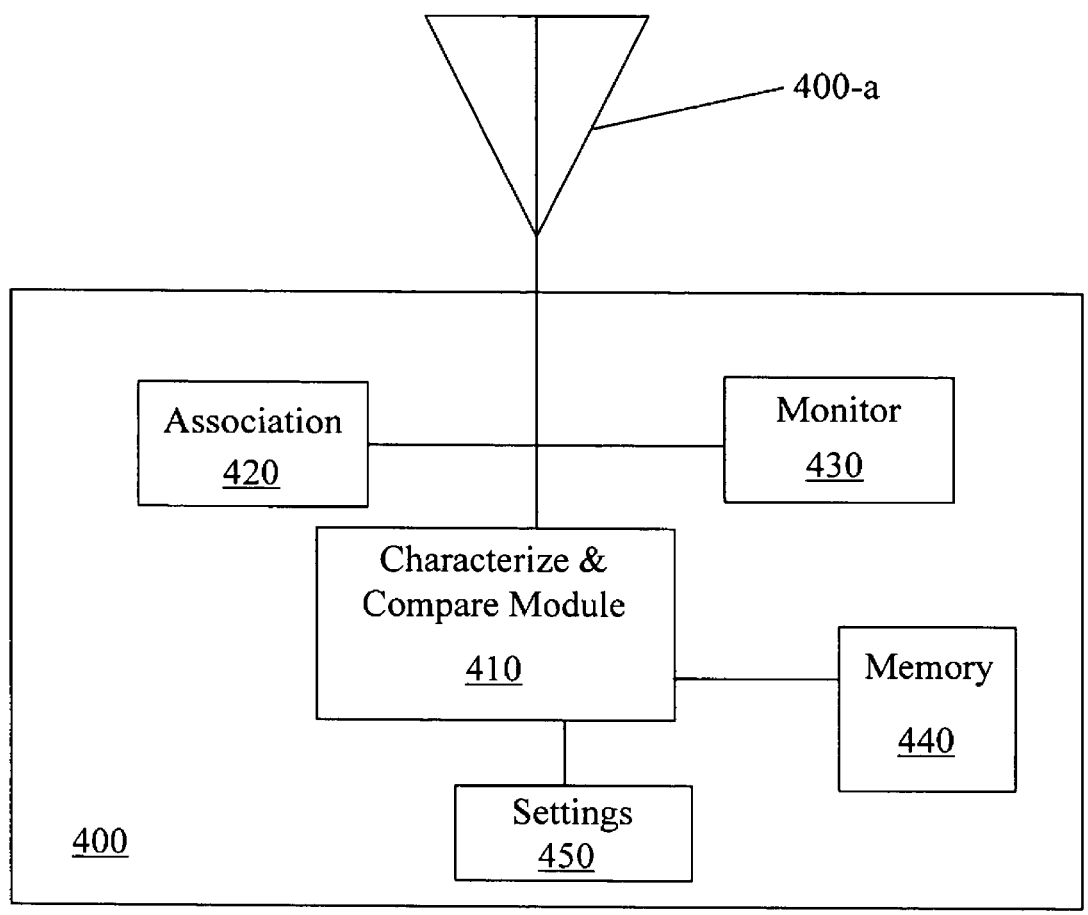
FIG. 4 illustrates modules of a wireless device, according to one embodiment of the present invention.

Modules of a wireless device, according to one embodiment of the present invention, are illustrated in greater detail in FIG. 4. The wireless device 400 again has an antenna 400-*a*, where that antenna is connected to various modules. It is noted that in some embodiments, the function of the separate modules may be performed by a single processor, in hardware and software, as illustrated in FIG. 1. The modules illustrated are an association module 420 that facilitates the association of other wireless devices with the wireless device 400 and a monitor module 430 that monitors signals received through the antenna. Both modules, 420 and 430, are in communication with a characterize and compare module 410, as well as the antenna 400-*a*. The latter module is also in communication with a memory 440 and a settings module, that may be or may utilize memory. The memory is used for, among other things, storing characteristics of wireless devices exhibiting aberrant behavior. Based on the results of the characterize and compare module, settings provided in the settings module may altered for a period of time to accommodate wireless devices exhibiting aberrant behavior.

Additionally, in alternate embodiments, when the wireless device does not see any beacons for the prescribed period, it checks to see what the current PHY is. If the current PHY has a particular configuration, it can modify registers in that PHY core to increase the frequency tracking bandwidth. This ensures that if the AP has a carrier frequency jitter, it can still lock on to the carrier frequency. When the wireless device disassociates with the access point, the frequency tracking bandwidth is brought back to the default value. If the driver is disabled, the wireless management software tells the driver to send a disassociate packet which goes through the same code path as above. Also, on a resume from sleep mode, the wireless device checks to see if the core had a wide frequency bandwidth before the device went to sleep and it restores the freq tracking bandwidth after waking up.

It is noted that while the issue of signals being sent out from an AP outside of a center channel is discussed, the present invention is not limited to such a configuration. Rather, the present invention is directed to assessing abnormal behavior in wireless devices and correcting for the abnormality. In the context of the present invention, such abnormal behavior is behavior for which a majority of wireless devices for an environment do not exhibit. It is expected that such abnormal behavior would still be within the specification for communication with the network environment, but the present invention is also applicable to behaviors that are outside of the specification. Generally, the criteria that should be applied in determining whether such abnormal behavior should be accommodated involves the weighing of the importance of the abnormally functioning device to the overall network environment.

Also, while the examples discussed above address the abnormal behavior of access points within a wireless environment, the present invention is also directed to accommodating abnormal behavior of non-access point wireless devices, such as laptop computers, mobile telephones and other wireless access devices, which interact with normally behaving APs and wireless devices. Examples of some abnormal behavior by wireless devices include instances where fields in packets are not set or are set improperly or the use of short slot times where it is not expected.

It is also noted that the present application has been discussed mostly in terms of access points for IEEE 802.11a/b/g networks, the present invention is not limited to such configurations. The present invention may be applicable to any wireless networking environment where at least one of the devices exhibits aberrant behavior that must be accommodated. Besides wireless computing environments operating under the IEEE 802.11 standards, the present invention is also applicable to networks operating under IEEE 802.16, BLUETOOTH™, a short-range radio technology, HomeRF, HiperLAN, WiMax or other configurations. It would also be within the scope of the invention to implement the disclosed elements of the invention in discrete electronic components, thereby taking advantage of the functional aspects of the invention. Additionally, the present invention can be implemented totally or partially through software.

Although the invention has been described based upon these preferred embodiments, it would be apparent to those of skilled in the art that certain modifications, variations, and alternative constructions would be apparent, while remaining within the spirit and scope of the invention. In order to determine the metes and bounds of the invention, therefore, reference should be made to the appended claims.

The invention claimed is:

1. A method, comprising:
    establishing communication with at least one wireless device;
    monitoring signals received from the at least one wireless device via a single channel;
    determining characteristics of the at least one wireless device based on the monitored signals;
    comparing the determined characteristics with prescribed characteristics of wireless devices exhibiting aberrant behavior; and
    widening an evaluation region of the single channel, while maintaining a same center frequency of the evaluation region of the single channel, based on the comparing,
    wherein the monitoring of the signals received from the at least one wireless device comprises determining whether beacon signals are continuously being received from the at least one wireless device, and
    wherein the monitoring of the signals, determining of the characteristics and comparing of the determined characteristics are repeated a predetermined number of times before widening the evaluation region of the single channel.

2. A method according to claim 1, wherein the predetermined number comprises three.

3. A method according to claim 1, wherein the establishing of the communication with the at least one wireless device comprises establishing communication with an access point controlling at least a portion of a wireless network.

4. A method according to claim 1, further comprising modifying physical layer settings to increase frequency tracking bandwidth.

5. A method according to claim 4, further comprising resetting the physical layer settings after a predetermined period of time.

6. A method according to claim 1, wherein the establishing of the communication comprises associating with the at least one wireless device according to at least one standard of Institute of Electrical and Electronics Engineers (IEEE) 802.11.

7. A method according to claim 1, wherein the comparing of the determined characteristics comprises comparing the determined characteristics with characteristics for wireless devices exhibiting aberrant behavior, wherein the aberrant behavior complies with communications standards for a wireless network.

8. A method according to claim 1, wherein the monitoring of the signals, determining of the characteristics and comparing of the determined characteristics differentiate when the at least one wireless device is no longer in communication.

9. An apparatus, comprising:
    establishing means for establishing communication with at least one wireless device;
    monitoring means for monitoring signals received from the at least one wireless device via a single channel;
    determining means for determining characteristics of the at least one wireless device based on the monitored signals;
    comparing means for comparing the determined characteristics with prescribed characteristics of wireless devices exhibiting aberrant behavior; and
    widening means for widening an evaluation region of the single channel, while maintaining a same center frequency of the evaluation region of the single channel, based on the comparing, wherein the monitoring means comprises means for determining whether beacon signals are continuously being received from the at least one wireless device, and wherein the monitoring means, determining means and comparing means are configured to repeat their functions a predetermined number of times before the widening means widens the evaluation region of the single channel.

10. An apparatus according to claim 9, wherein the predetermined number comprises three.

11. An apparatus according to claim 9, wherein the establishing means comprises means for establishing communication with an access point controlling at least a portion of a wireless network.

12. An apparatus according to claim 9, further comprising means for modifying physical layer settings to increase frequency tracking bandwidth.

13. An apparatus according to claim 12, further comprising:
resetting means for resetting the physical layer settings after a predetermined period of time.

14. An apparatus according to claim 9, wherein the establishing means comprises means for associating with the at least one wireless device according to at least one standard of Institute for Electrical and Electronics Engineers (IEEE) 802.11.

15. An apparatus according to claim 9, wherein the comparing means comprises means for comparing the determined characteristics with characteristics for wireless devices exhibiting aberrant behavior, wherein the aberrant behavior complies with communications standards for a wireless network.

16. An apparatus according to claim 9, wherein the monitoring means, determining means and comparing means are configured to differentiate when the at least one wireless device is no longer in communication.

17. An apparatus, comprising:
at least one antenna configured to send and receive signals; and
at least one processor configured to send, receive and process the signals received and sent by the at least one antenna,
wherein the at least one processor is configured to:
establish communication with at least one wireless device, monitor signals received from the at least one wireless device via a single channel,
determine characteristics of the at least one wireless device based on the monitored signals,
compare the determined characteristics with prescribed characteristics of wireless devices exhibiting aberrant behavior, and
widen an evaluation region of the single channel, while maintaining a same center frequency of the evaluation region of the single channel, based on the comparison, wherein the at least one processor is configured to determine whether beacon signals are continuously being received from the at least one wireless device, and wherein the at least one processor is configured to monitor signals, determine characteristics and compare the determined characteristics a predetermined number of times before widening the evaluation region of the single channel.

18. An apparatus according to claim 17, wherein the predetermined number comprises three.

19. An apparatus according to claim 17, wherein the wireless device is configured to communicate with an access point controlling at least a portion of a wireless network.

20. An apparatus according to claim 17, wherein the at least one processor is configured to modify physical layer settings to increase frequency tracking bandwidth.

21. An apparatus according to claim 20, wherein the at least one processor is configured to reset the physical layer settings after a predetermined period of time.

22. An apparatus according to claim 17, wherein the at least one processor is configured to associate with the at least one wireless device according to at least one standard of Institute of Electrical and Electronics Engineers (IEEE) 802.11.

23. An apparatus according to claim 17, wherein the at least one processor is configured to compare the determined characteristics with characteristics for wireless devices exhibiting aberrant behavior, wherein the aberrant behavior complies with communications standards for a wireless network.

24. An apparatus according to claim 17, wherein the at least one processor is configured to monitor signals, determine characteristics and compare the determined characteristics to differentiate when the at least one wireless device is no longer in communication.

25. A method according to claim 1, wherein the communication with the wireless device occurs within the single channel, a center of the single channel has a predetermined frequency range within a frequency range of the single channel and the prescribed characteristics of wireless devices exhibiting aberrant behavior include the device sending packets at a frequency that is outside of the center of channel frequency by at least a predetermined amount.

26. An apparatus according to claim 9, wherein the communication with the wireless device occurs within the single channel, a center of the single channel has a predetermined frequency range within a frequency range of the single channel and the prescribed characteristics of wireless devices exhibiting aberrant behavior include the device sending packets at a frequency that is outside of the center of channel frequency by at least a predetermined amount.

27. An apparatus according to claim 17, wherein the communication with the wireless device occurs within the single channel, a center of the single channel has a predetermined frequency range within a frequency range of the single channel and the prescribed characteristics of wireless devices exhibiting aberrant behavior include the device sending packets at a frequency that is outside of the center of channel frequency by at least a predetermined amount.

* * * * *